United States Patent
Hong

(10) Patent No.: US 7,742,685 B2
(45) Date of Patent: Jun. 22, 2010

(54) OPTICAL DISC APPARATUS CAPABLE OF TIME SEARCH FUNCTION AND TIME SEARCH PLAYBACK METHOD THEREOF

(75) Inventor: Seong Pyo Hong, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1204 days.

(21) Appl. No.: 11/326,444

(22) Filed: Jan. 6, 2006

(65) Prior Publication Data

US 2006/0153536 A1 Jul. 13, 2006

(30) Foreign Application Priority Data

Jan. 12, 2005 (KR) .............. 10-2005-0002800

(51) Int. Cl.
*H04N 5/00* (2006.01)
(52) U.S. Cl. .................... 386/125; 386/126
(58) Field of Classification Search ............ 386/1, 386/45–46, 95–96, 69, 125–126
See application file for complete search history.

(56) References Cited

U.S. PATENT DOCUMENTS 7,095,951 B2 * 8/2006 Moriyama et al. ............ 386/95
7,376,335 B2 * 5/2008 De Haan ...................... 386/69

\* cited by examiner

*Primary Examiner*—Thai Tran
*Assistant Examiner*—Nigar Chowdhury
(74) *Attorney, Agent, or Firm*—Birch, Stewart, Kolasch & Birch, LLP

(57) ABSTRACT

An optical disc apparatus capable of time search function and a time search playback method thereof are disclosed, wherein the method comprises: searching for a playback area corresponding to a particular time using C_PBIT (Cell Playback Information Table) and VTS_VOBU_ADMAP (Video Title Set Video Object Unit Address Map) included in navigation information of an optical disc; and performing a playback operation from the searched playback area.

16 Claims, 5 Drawing Sheets

OPTICAL DISC APPARATUS CAPABLE OF TIME SEARCH FUNCTION AND TIME SEARCH PLAYBACK METHOD THEREOF

BACKGROUND OF THE INVENTION

1. Field of the Invention

The present document relates to an optical disc apparatus capable of time search function and a time search playback method thereof wherein, when a time search playback is requested in the optical disc apparatus capable of play-backing an optical disc like a DVD (Digital Versatile Disk), a start address of a VOBU (Video Object Unit) corresponding thereto is searched to normally conduct a time search operation.

2. Description of the Related Art

In general, a DVD optical disc recorded therein with a high definition of video data and a high fidelity of audio data has been widely distributed and commercialized. For example, the optical disc apparatus searches Video Title Set Time Map Table (VTS_TMAPT) included in Video Title Set Information (VTSI) out of navigation information recorded in advance in the DVD as illustrated in FIG. 1 when a user selectively designates an arbitrary time to request a time search playback while conducting a data playback operation.

Furthermore, the optical disc apparatus refers to VTS_T-MAP information recorded and included in the VTS-TMAPT. The VTS-TMAP information includes TMU (time unit), Map Entry Numbers (MAP_EN_Ns) and MAP_ENT (Map Entry).

Meanwhile, the MAP_ENT is recorded with VOBU Start Address as many as the MAP_EN_Ns, where the k th VOBU Start Address (VOBU Start Address #k) is a value of time of the TMU multiplied by 'k'.

Consequently, TMU multiplied by the MAP_EN_Ns becomes an entire playback time, from which a playback address of a particular area can be known. For example, if the TMU is 2 seconds, and the MAP_EN_Ns is '1800', the entire playback time of relevant program chain is 3600 seconds, i.e., 1 hour. If a playback operation is to be conducted from a 30-minute area in response to a user's request, a VOBU Start Address recorded in MAP_ENT of the 900 th area is searched and played back, and then a time search playback operation from the user-desired 30-minute area is implemented.

However, the VTS-TMAPT information searched for implementing the time search playback operation in the conventional optical disc apparatus thus described may be optionally recorded or not recorded in the DVD navigation information. If the VTS-TMAPT information is not recorded, there is no way of conducting the time search playback operation.

SUMMARY OF THE INVENTION

Accordingly, it is an object of the present invention to provide an optical disc apparatus capable of performing a normal time search function and a time search playback method thereof using VTS_VOBU_ADMAP (Video Title Set Video Object Unit Address Map) information mandatorily recorded in navigation information of an optical disc and C_PBIT (Cell Playback Information Table) of PGCI (Program Chain Information).

In accordance with the object of the present invention, there is provided a time search playback method of an optical disc apparatus, the method comprising: searching for a playback area corresponding to a particular time using C_PBIT (Cell Playback Information Table) and VTS_VOBU_AD-MAP (Video Title Set Video Object Unit Address Map) included in navigation information of an optical disc; and performing a playback operation from the searched playback area.

DETAILED DESCRIPTION OF THE INVENTION

Preferred embodiments of the time search playback method in the optical disc apparatus according to the present invention will be described in detail with reference to the accompanying drawings.

Figure 1:
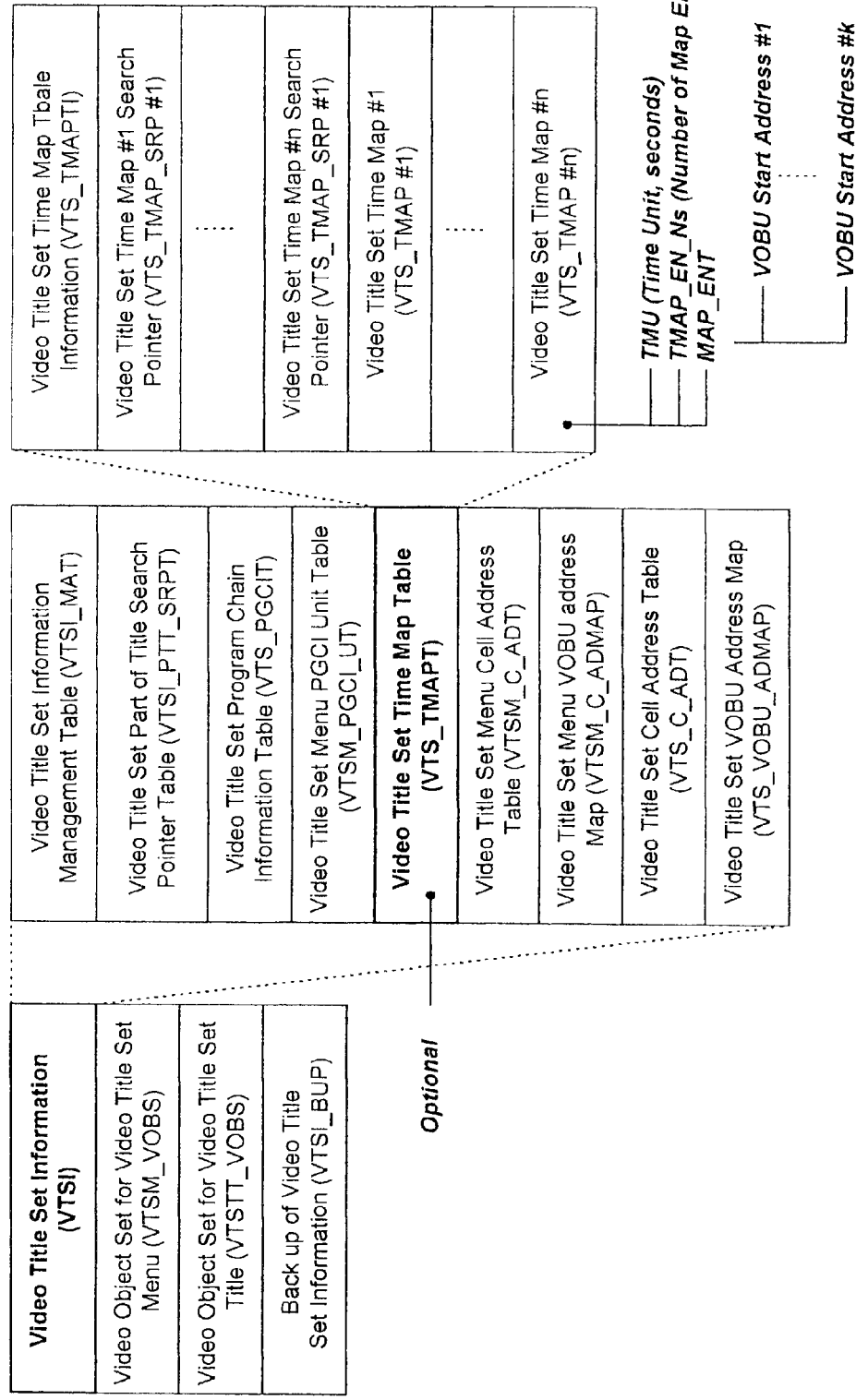
FIG. 1 is a schematic drawing illustrating VTS-TMAPT used for the conventional time search playback operation.
Figure 2:
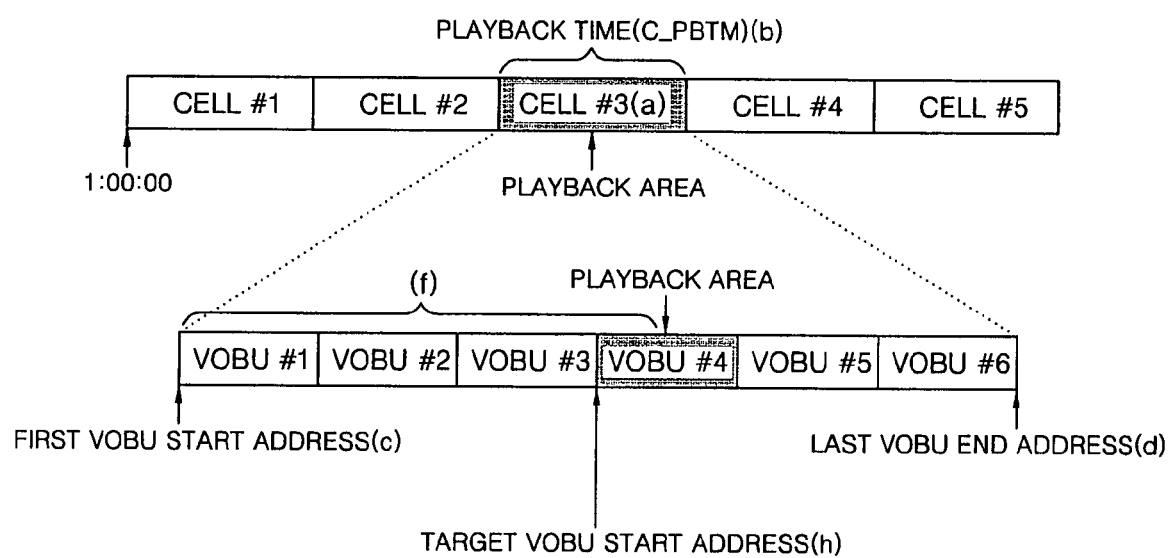
FIG. 2 is a schematic drawing illustrating a construction of an optical disc apparatus according to the present invention.

FIG. 2 is a schematic drawing illustrating a construction of an optical disc apparatus according to the present invention.

Referring to FIG. 2, an optical disc apparatus according to the present invention may include an optical pick-up (11), a VDP (Video Disc Play) system (12), a microcomputer (13), an On Screen Display (OSD) generator (14), and a memory (15).

First of all, an example of the optical disc (10) applicable to the present invention may be a DVD-ROM (Digital Versatile Disc-Recordable Only Medium), a once-recordable medium such as DVD-R (DVD-Recordable), and DVD-RW (DVD-Rewritable). An example of the optical disc apparatus may be a currently widely-commercialized DVDP (Digital Versatile Disc Player).

The optical pick-up (11) functions to record a user data on the optical disc (10), or to read out data stored in the optical disc (10).

The VDP system (12) divides the data stream read out from the optical pick-up (11) into a video data, an audio data and navigation information, and functions to playback the divided video and audio data and to display on a screen. The navigation information divided from the VDP system (12) is stored in the memory (15).

The microcomputer (13) acts to perform an overall operation of an optical disc apparatus. For example, the microcomputer (13) reads out the navigation information stored in a particular recording area of the optical disc (10), for example, a lead-in area when the optical disc (10) is insertedly accommodated in an optical disc apparatus, and performs a series of download operations for storing in the memory (15).

The microcomputer (13) searches for and refers to the navigation information stored in the memory (15), and operably controls the VDP system (12) to playback the data recorded in the optical disc (10) when a user requests data playback operation.

The microcomputer (13) includes a playback area search unit (13a) for searching for a playback area corresponding to a particular time using cell playback information table included in the program chain information mandatorily recorded in the navigation information of the optical disc (10), and Video Title Set Video Object Unit Address Map (VTS_VOBU_ADMAP) if a time search playback operation is requested by the user.

If the playback area corresponding to the particular time is searched by the playback area search unit (13a), the microcomputer (13) moves the optical pick-up (11) to the searched playback area, and controls the operation of the VDP system (12) to perform the data playback operation if it is discriminated that the optical pick-up (11) has reached the searched playback area. The particular time is a time corresponding to an area desired for playback, and may be a time for direct receipt from the user or a time stored in the memory (15) which is a time corresponding to erstwhile playback area. The user inputs time information relative to an area desired for time search via a user interface screen provided by the OSD generator (14).

Figure 3:
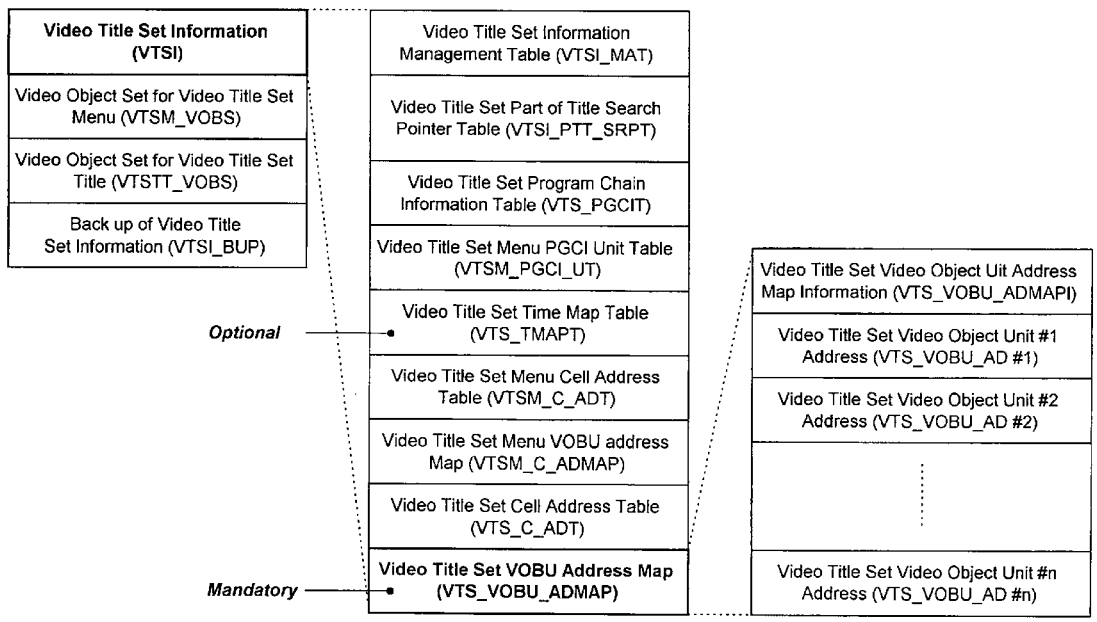
FIG. 3 is a schematic drawing illustrating Video Title Set Video Object Unit Address Map (VTS_C_ADMAP) according to the present invention.

Referring to FIG. 3, the VTS_VOBU_ADMAP information is included and recorded in VTSI (Video Title Set Information) and includes addresses (VTS_VOBU_AD #1 to VTS_VOBU_AD #n) information of all the Video Object Units included in Video Title Set.

Figure 4:
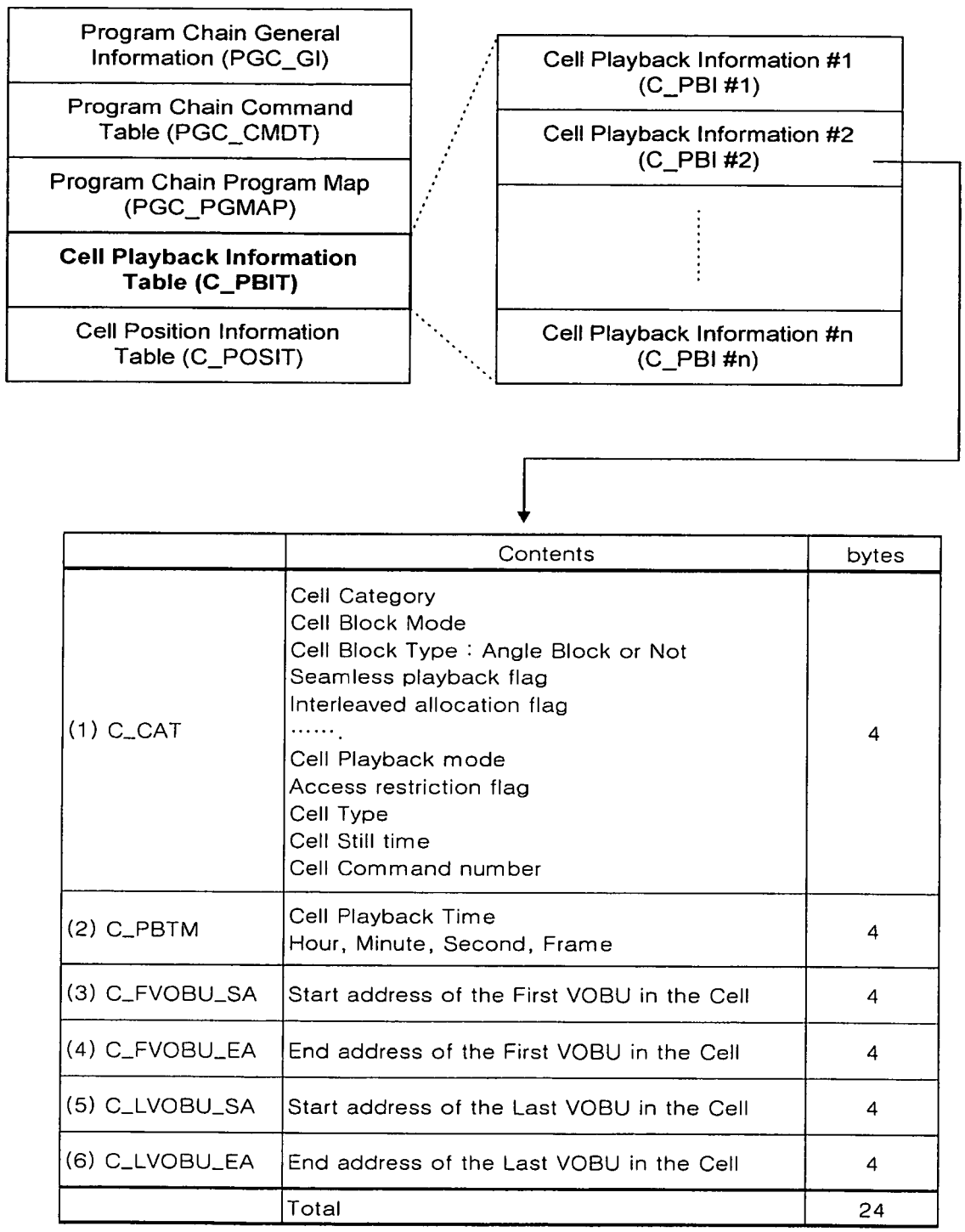
FIG. 4 is a schematic drawing illustrating cell playback information used for time search playback operation according to the present invention.

Meanwhile, the PGCI is recorded in VTS_PGCIT (Video Title Set_Program Chain Information Table) included in VTSI or VTS_PGCIT_UT (Video Title Set Menu Program Chain Information Unit Table), and as illustrated in FIG. 4, includes Cell Playback Information Table (C_PBIT) used in the course of performing the time search playback operation according to the present invention.

The C_PBIT includes a plurality of Cell Playback Information (C_PBI#1 to C_PBI#n). Furthermore, each cell playback information includes Cell Category (C_CAT), Playback time (C_PBI), Start Address of First Video Object Unit (C_FVOBU_SA) and End Address (C_FVOBU_EA), and Start Address of last Video Object Unit (C_LVOBU_SA) and End Address (C_LVOBU_EA).

Figure 5:
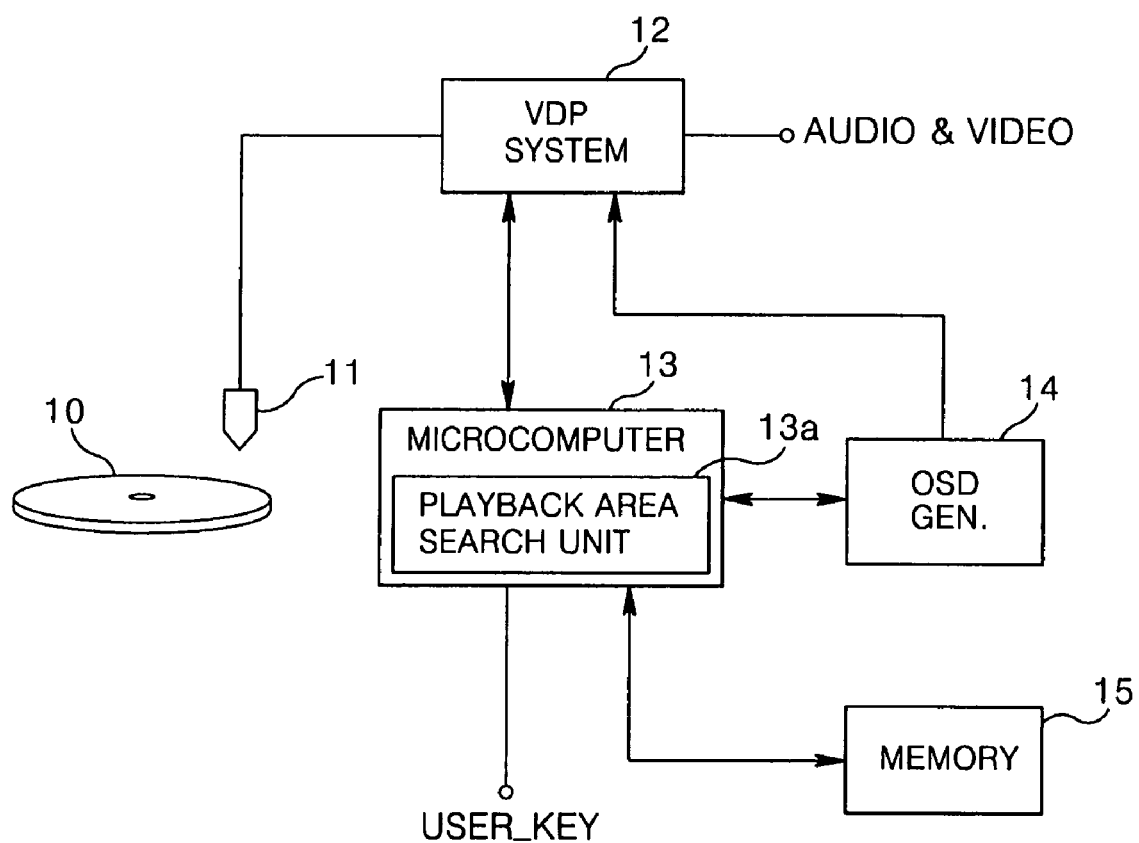
FIG. 5 is a schematic drawing explaining a time search playback method according to the present invention.

Now, the time search playback method according to the present invention will be described with reference to FIG. 5.

If time information relative to an area desired for playback corresponding to time search playback request is inputted, the microcomputer (13) controls the playback area search unit (13a) for searching for a playback area corresponding to the inputted time.

The playback area search unit (13a) discriminates which n th cell (a) of a title of the optical disc (10) desired for playback corresponds to an area corresponding to the inputted time. Whether the inputted time area corresponds to a certain n th cell can be known by sequentially adding the C-PBIT included in the C-PBIT table of PGCI to cell playback order. For example, if a time inputted by the user is 1 hour 37 minutes, and a playback time of each cell is 15 minutes, it can be known that the inputted time area corresponds to the third cell (Cell #3, a) of the optical disc (10) title.

Next, the playback area search unit (13a) checks a playback time (C_PBTM) (b) of a cell (a) corresponding to the inputted time area, a start address of a first Video Object Unit (VOBU #1) of the cell (a), and an end address (d) of a last Video Object Unit (VOBU #6).

Furthermore, the playback area search unit (13a) seeks the number (e) of the Video Object Unit contained in the cell (a) corresponding to the inputted time area. The number (e) of the Video Object Unit contained in the cell (a) corresponding to the inputted time area may be obtained by using the start address (c) of the first Video Object Unit (VOBU #1) and the end address (d) of the last Video Object Unit (VOBU #6).

The playback area search unit (13a) uses the information thus obtained to search a start address of a Video Object Unit (VOBU) corresponding to the inputted time area. The playback area search unit (13a) can search the start address of the Video Object Unit (VOBU) corresponding to the inputted time area, if the number (g) of Video Object Unit between a start area of the first Video Object Unit (VOBU #1) of the cell (a) corresponding to the inputted time area and the inputted time area is known.

The number (g) of Video Object Unit between a start area of the first Video Object Unit (VOBU #1) of the cell (a) corresponding to the inputted time area and the inputted time area can be obtained by the following Equation 1.

$$g = \{e*(f/b)\} \quad \text{EQUATION 1}$$

where, b denotes a playback time (C_PBTM) of the cell (a) corresponding to the inputted time area, e represents the number of Video Object Unit included in the cell (a), and f is a time from a start area of the cell (a) to the inputted time area. The time (f) from the start area of the cell (a) to the inputted time area can be obtained by subtracting from the inputted time a cell playback time added by from the first cell (Cell #1) to a cell (Cell #2) before the cell (a).

The playback area search unit (13a) searches for, as a playback area desired to be played back by a user, a start address area (h) of Video Object Unit (VOBU #4) distanced as long as the number (g) of Object Unit obtained from the first Video Object Unit (VOBU #1) of the cell (a) corresponding to the inputted time area.

If the playback area corresponding to the inputted time is searched via a series of processes thus described, the microcomputer (13) controls the operation of the optical pick-up (11) and the VDP system (12) so that a playback operation can be conducted from the searched playback area.

As apparent from the foregoing, there is an advantage in the optical disc apparatus capable of time search function and the time search playback method thereof thus described according to the present invention in that Video Title Set Object Unit Address Map Information (VTS_VOBU_ADMAP) mandatorily recorded in navigation information and Cell Playback Information Table (C_PBIT) of Program Chain Information (PGCI) are used to enable to conduct a time search operation desired by a user at all times, without recourse to Video Title Set Time Map Table (VTS_TMAPT) optionally recorded or not recorded in the navigation information of an optical disc during request of time search playback.

The present invention has been described above using a presently preferred embodiment, but those skilled in the art will appreciate that various modifications are possible. Accordingly, all such modifications are intended to be included within the spirit and scope of the present invention and the above disclosure should be construed as limited only by the metes and bounds of the appended claims.

What is claimed in:

1. A time search playback method of an optical disc apparatus, the method comprising:

searching for a playback area corresponding to a particular time using a C_PBIT (Cell Playback Information Table) and a VTS_VOBU_ADMAP (Video Title Set Video Object Unit Address Map) included in navigation information of an optical disc; and performing a playback operation from the searched playback area, wherein the search step comprises:

detecting a cell corresponding to the particular time by using the C_PBIT, and detecting a start address of a Video Object Unit corresponding to the particular time out of Video Object Units contained in the cell thus detected, using the VTS_VOBU_ADMAP, and an area corresponding to the detected start address of the Video Object Unit is searched as the playback area, and
wherein the cell corresponding to the particular time is detected by sequentially adding cell playback time contained in the Cell Playback Information Table according to a cell playback order.

2. The method as defined in claim 1, wherein the start address of the Video Object Unit is a start address of a Video Object Unit corresponding to an area distanced as many as the number of Video Object Units between a start area of a first Video Object Unit of the cell and an area corresponding to the particular time from the first Video Object Unit of the cell.

3. The method as defined in claim 2, wherein the number of Video Object Units between the start area of the first Video Object Unit of the cell corresponding to the particular time and the area corresponding to the particular time is the number obtained by dividing a playback time of the cell corresponding to the particular time by a time from the playback start area of the cell to the area corresponding to the particular time and multiplying the result by the number of Video Object Units contained in the cell.

4. The method as defined in claim 3, wherein the time from the playback start area of the cell to the particular time is a time subtracted by the cell playback time added by from the particular time to a cell before the cell corresponding to the particular time.

5. The method as defined in claim 1, wherein the playback operation is to perform a data playback operation from the searched playback area, if it is discriminated that an optical pick-up is moved to the searched playback area and the optical pick-up has reached the searched playback area.

6. The method as defined in claim 1, wherein the particular time is a time corresponding to an area desired for playback.

7. The method as defined in claim 1, wherein the optical disc is any one of a DVD-ROM (Digital Versatile Disc-Recordable Only Medium), a once-recordable DVD-R (DVD-Recordable), and a DVD-RW (DVD-Rewritable).

8. The method as defined in claim 1, wherein the cell playback information table comprises multiple cell playback information, wherein each cell playback information comprises a playback time, a start address and an end address information of a first Video Object Unit, and a start address and an end address of a last Video Object Unit of a cell.

9. An optical disc apparatus comprising:
an optical pick-up configured to read out data recorded in an optical disc;
a playback processor configured to play back the data read out from the optical pick-up and to output the same;
a playback area search unit configured to search for a playback area corresponding to a particular time by using cell playback time contained in a cell playback information table, the cell playback time being sequentially added according to a cell playback order for a cell corresponding to the particular time, and by using a Video Title Set Video Object Unit Address Map, the cell playback information table and the Video Title Set Video Object Unit Address Map being contained in navigation information read out from the optical disc; and
a microcomputer configured to control the optical pick-up and the playback processor so that the playback operation can be performed from the searched playback area.

10. The apparatus as defined in claim 9, wherein the playback area search unit detects a start address of a Video Object Unit corresponding to the particular time out of Video Object Units contained in the cell corresponding to the particular time by using the Video Title Set Video Object Unit Address Map, and searching as the playback area the detected start address of the Video Object Unit.

11. The apparatus as defined in claim 10, wherein the number of the Video Object Units between the start area of the first Video Object Unit of the cell corresponding to the particular time and an area corresponding to the particular time is the number obtained by dividing a playback time of the cell corresponding to the particular time by a time from the playback start area of the cell to the area corresponding to the particular time and multiplying the result by the number of Video Object Units contained in the cell.

12. The apparatus as defined in claim 11, wherein the time from the playback start area of the cell to the particular time is a time subtracted by the cell playback time added from the particular time to a cell before the cell corresponding to the particular time.

13. The apparatus as defined in claim 9, wherein the particular time is a time corresponding to an area desired for playback.

14. The apparatus as defined in claim 8, wherein the optical disc is any one of a DVD-ROM (Digital Versatile Disc-Recordable Only Medium), a once-recordable DVD-R (DVD-Recordable), and a DVD-RW (DVD-Rewritable).

15. The apparatus as defined in claim 9, wherein the cell playback information table comprises multiple cell playback information, wherein each cell playback information comprises a playback time, a start address and an end address information of a first Video Object Unit, and a start address and an end address of a last Video Object Unit of a cell.

16. A time search playback method of an optical disc apparatus, the method comprising:
searching for a playback area corresponding to a particular time by sequentially adding cell playback time contained in a C_PBIT (Cell Playback Information Table) according to a cell playback order for a cell corresponding to the particular time and by using a VTS_VOBU_ADMAP (Video Title Set Video Object Unit Address Map), the C_PBIT and the VTS_VOBU_ADMAP being included in navigation information of an optical disc; and
performing a playback operation from the searched playback area.

* * * * *